(12) United States Patent
Nakamori

(10) Patent No.: US 10,725,232 B2
(45) Date of Patent: Jul. 28, 2020

(54) BACKLIGHT DEVICE AND LIQUID CRYSTAL DISPLAY DEVICE COMPRISING THE SAME

(71) Applicant: Japan Display Inc., Tokyo (JP)

(72) Inventor: Yosuke Nakamori, Tokyo (JP)

(73) Assignee: Japan Display Inc., Tokyo (JP)

( * ) Notice: Subject to any disclaimer, the term of this patent is extended or adjusted under 35 U.S.C. 154(b) by 16 days.

(21) Appl. No.: 16/190,746

(22) Filed: Nov. 14, 2018

(65) Prior Publication Data
US 2019/0146147 A1 May 16, 2019

(30) Foreign Application Priority Data

Nov. 14, 2017 (JP) .................................. 2017-219249

(51) Int. Cl.
*F21V 8/00* (2006.01)
*G02F 1/13357* (2006.01)
*G02F 1/1333* (2006.01)

(52) U.S. Cl.
CPC ........... *G02B 6/0083* (2013.01); *G02B 6/009* (2013.01); *G02B 6/0088* (2013.01);
(Continued)

(58) Field of Classification Search
CPC .... G02B 6/0088; G02B 6/009; G02B 6/0083; G02B 6/0055; G02B 6/0011; G02B 6/0013; G02B 6/0015; G02B 6/0016; G02B 6/0018; G02B 6/002; G02B 6/0021; G02B 6/0023; G02B 6/0025; G02B 6/0026; G02B 6/0028; G02B 6/003; G02B 6/0031; G02B 21/0032; G02B 21/06; G02B 21/16; G02B 6/0033; G02B 6/0035; G02B 6/0036; G02B 6/0038; G02B 6/004; G02B 6/0041; G02B 6/0043; G02B 6/0045; G02B 6/0046; G02B 6/0048; G02B 6/0051; G02B 6/0053; G02B 6/0056; G02B 6/0058; G02B 6/006; G02B 6/0061; G02B 6/0063; G02B 6/0065; G02B 6/0066; G02B 6/0068; G02B 6/007; G02B 6/0071; G02B 6/0073; G02B 6/0075; G02B 6/0076; G02B 6/0078; G02B 6/008; G02B 6/10; G02B 6/102; G02B 6/105;
(Continued)

(56) References Cited

U.S. PATENT DOCUMENTS

2007/0121023 A1* 5/2007 Yang .................. G02F 1/133603
349/58
2009/0002595 A1* 1/2009 Kim .................. G02F 1/133308
349/61

(Continued)

FOREIGN PATENT DOCUMENTS

JP 2015-176680 A 10/2015
JP 2016-207279 A 12/2016

*Primary Examiner* — Shan Liu
(74) *Attorney, Agent, or Firm* — K&L Gates LLP

(57) ABSTRACT

According to one embodiment, a backlight device includes a case with a bottom plate and a plurality of side plates, a wiring pattern formed in the case and including a wiring line and a connection portion, a light guide including an emission surface and an incident surface and arranged on the bottom plate, and a light-emitting device mounted on the connection portion and including a light-emitting surface opposing the incident surface of the light guide and a mount surface opposing the connection portion.

10 Claims, 12 Drawing Sheets

(52) U.S. Cl.
CPC ...... *G02F 1/133615* (2013.01); *G02B 6/0055* (2013.01); *G02F 2001/133314* (2013.01)

(58) Field of Classification Search
CPC ...... G02B 6/107; G02B 6/122; G02B 6/1221; G02B 6/1223; G02B 6/1225; G02B 6/1226; G02B 2006/12083; G02B 2006/12085; G02B 2006/12088; G02B 2006/1209; G02B 2006/12092; G02B 2006/12095; G02F 1/33615; G02F 1/133308; G02F 1/133608; G02F 2001/133311; G02F 2001/133314; G02F 2001/133317; G02F 2001/13332; G02F 2001/133322; G02F 2001/133325; G02F 2001/133328; G02F 2001/133331; G02F 2001/133334; G02F 1/0121; G02F 1/0327; G02F 1/076; G02F 1/133; G02F 1/13306; G02F 1/1345; G02F 1/13452; G02F 1/13454; G02F 1/13458; G02F 2001/133388; G02F 2001/133612; G02F 2001/13456; G01N 21/62; G01N 21/6458; G09G 2300/0426; G09G 2300/0408; G09G 3/3655; G09G 3/3674; G09G 3/3685; G09G 2290/00; G09G 2320/0223; G09G 2300/0421; G09G 3/36; H01L 23/48; H01L 23/49572; H01L 2224/50; H01L 2224/79; H01L 2224/86; H01L 2225/06579; H01L 2225/107; H01L 24/50; B82Y 20/00
USPC ............................. 349/65, 58–60, 149–152
See application file for complete search history.

(56) References Cited

U.S. PATENT DOCUMENTS

| | | | |
|---|---|---|---|
| 2010/0165237 A1* | 7/2010 | Jung | G02F 1/133608 349/58 |
| 2011/0134371 A1* | 6/2011 | Shimojoh | G02B 6/0083 349/65 |
| 2013/0038211 A1* | 2/2013 | Kang | G02F 1/133603 315/113 |
| 2013/0039092 A1* | 2/2013 | Cho | G02B 6/0091 362/612 |
| 2014/0334182 A1* | 11/2014 | Chen | G02B 6/0083 362/611 |
| 2015/0226913 A1* | 8/2015 | Shimizu | G02B 6/0085 348/836 |
| 2015/0260909 A1* | 9/2015 | Nambu | G02B 6/0091 362/613 |
| 2016/0306092 A1 | 10/2016 | Yoshida | |

* cited by examiner

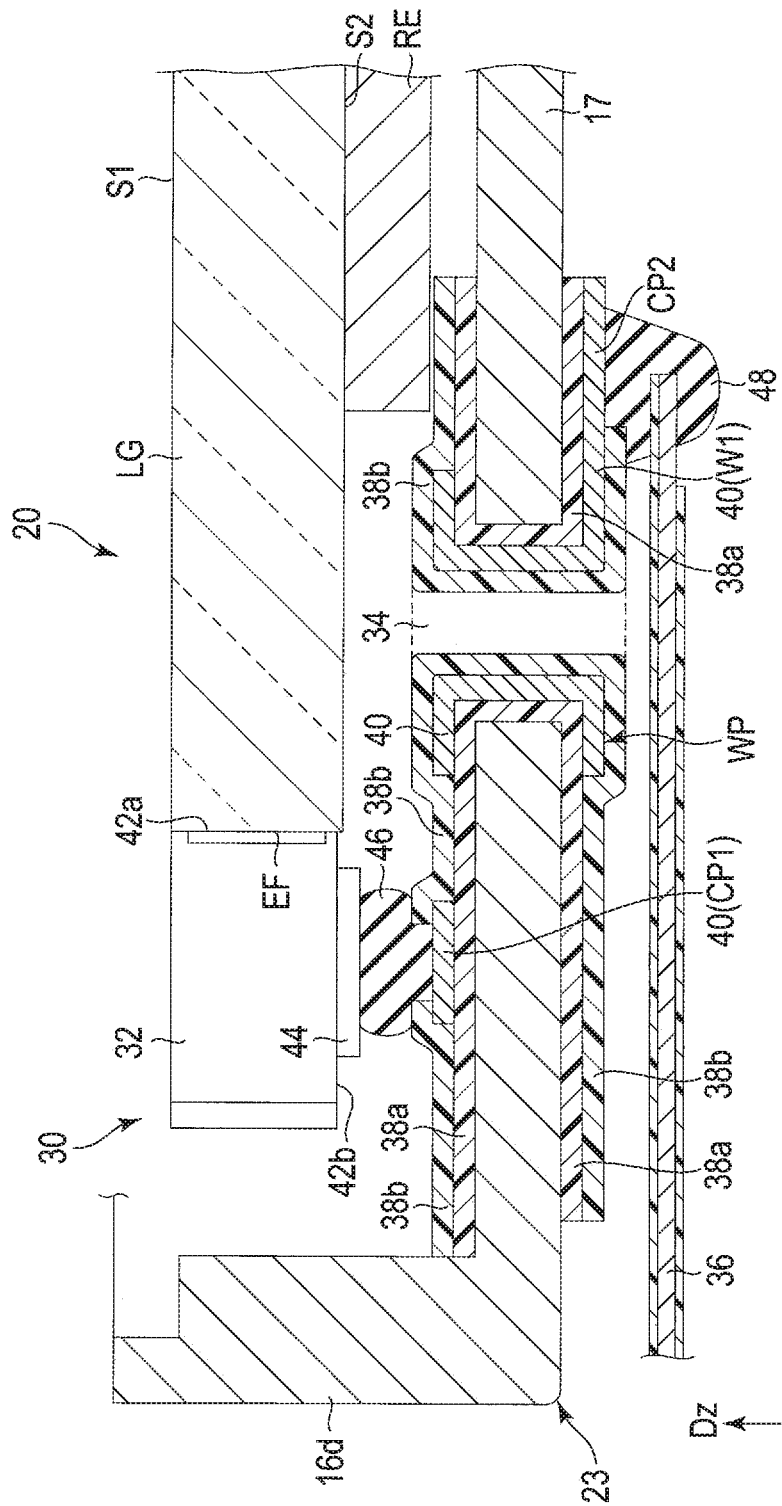
F I G. 7

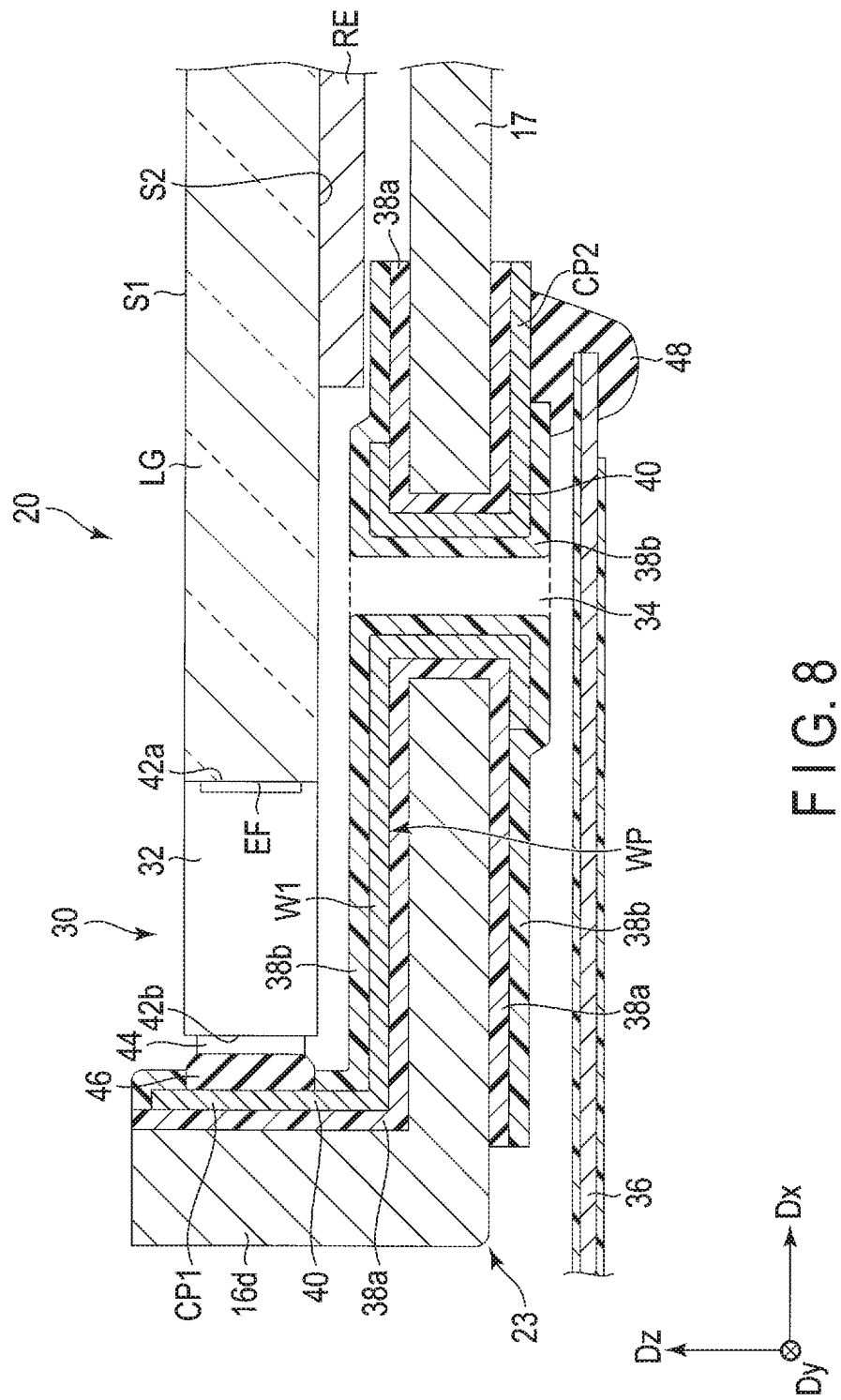
F I G. 8

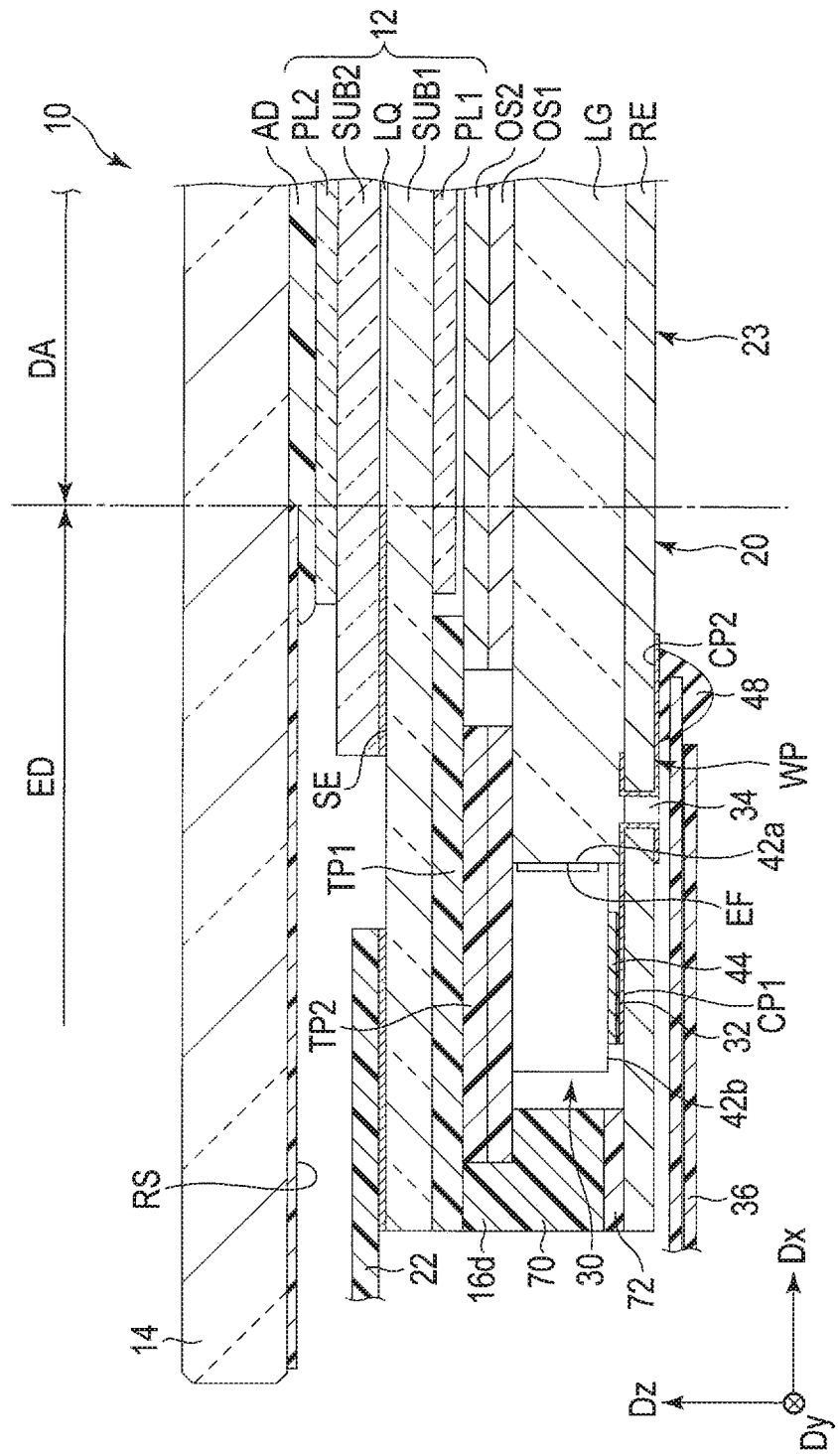
F I G. 11

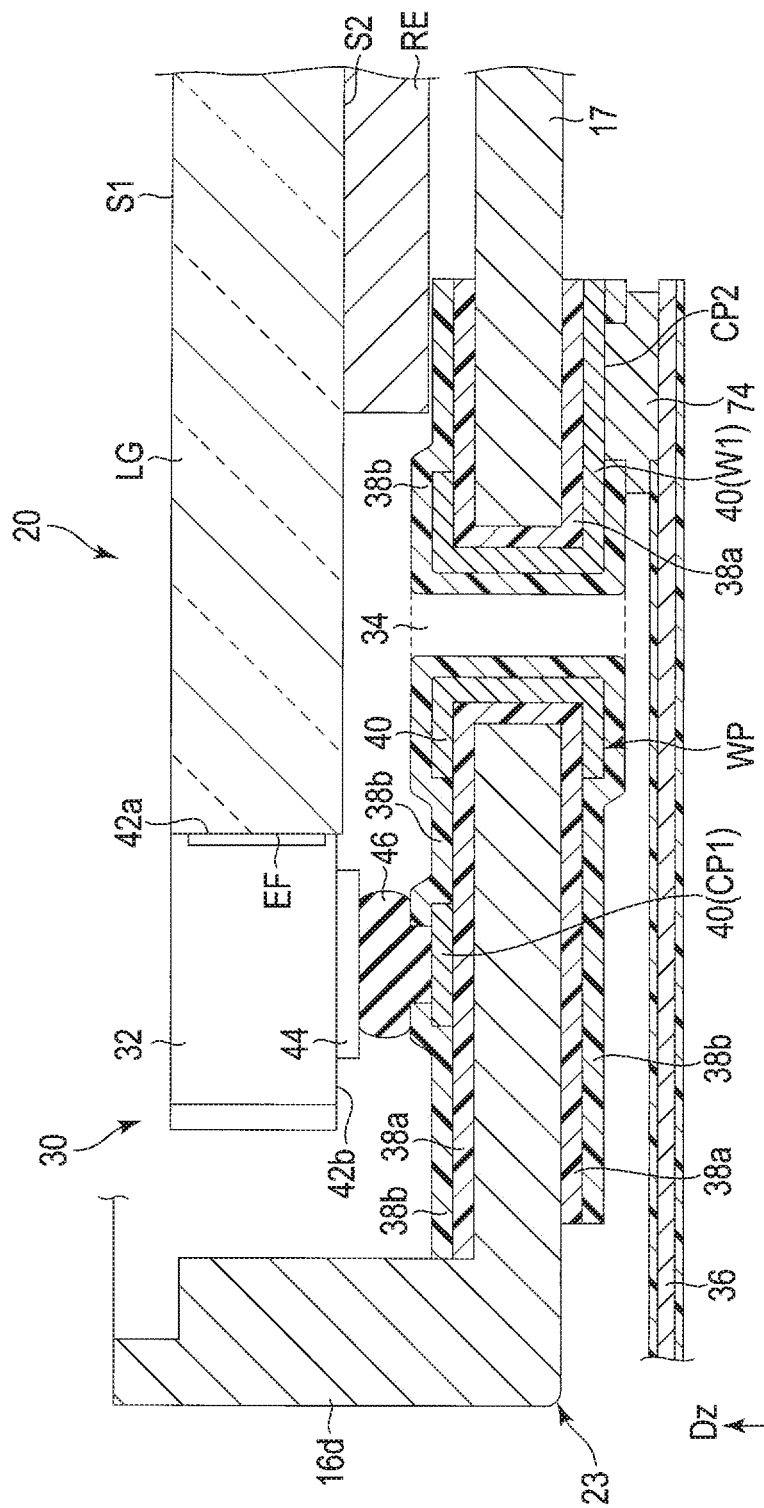
F I G. 12

BACKLIGHT DEVICE AND LIQUID CRYSTAL DISPLAY DEVICE COMPRISING THE SAME

CROSS-REFERENCE TO RELATED APPLICATIONS

This application is based upon and claims the benefit of priority from Japanese Patent Application No. 2017-219249, filed Nov. 14, 2017, the entire contents of which are incorporated herein by reference.

FIELD

Embodiments described herein relate generally to a backlight device and a liquid crystal display device comprising the same.

BACKGROUND

Liquid crystal display devices are widely used as display devices for smart phones, tablet computers, car-navigation systems and the like. In general, a liquid crystal display device comprises a liquid crystal display panel and a backlight device disposed to be overlaid on a rear surface of the liquid crystal display panel and to illuminate the liquid crystal display panel. The backlight device includes a case (bezel or frame), a reflective layer, a light guide, an optical sheet, a light source unit which irradiates light to enter the light guide. The light source unit includes a wiring substrate such as an FPC and a plurality of light sources (such as light-emitting diodes or LEDs) mounted on the wiring substrate. The light source unit is held in a predetermined position by attaching the wiring substrate onto the frame, for example.

Conventionally, the width of the frame of a liquid crystal display device is reduced mainly by narrowing right and left edges of the frame. In recent years, there is an increasing demand of reducing the width of the widest edge of the frame, which is on the side of the light source (light entering side).

SUMMARY

The present application relates generally to a backlight device and a liquid crystal display device including the same.

According to one embodiment, a backlight device includes a case with a bottom plate and a plurality of side plates, a wiring pattern formed in the case and including a wiring line and a connection portion, a light guide including an emission surface and an incident surface and arranged on the bottom plate, and a light-emitting device mounted on the connection portion and including a light-emitting surface opposing the incident surface of the light guide and a mount surface opposing the connection portion.

BRIEF DESCRIPTION OF THE DRAWINGS

FIG. 7 is a cross-sectional view of the backlight device taken along line B-B of FIG. 5.

FIG. 8 is a cross-sectional view of a light source-side portion of a backlight device according to a second embodiment.

FIG. 11 is a cross-sectional view of a light source-side portion of a liquid crystal display device according to a fifth embodiment.

FIG. 12 is a cross-sectional view of a light source-side portion of a liquid crystal display device according to a first modified example.

DETAILED DESCRIPTION

Figure 1:
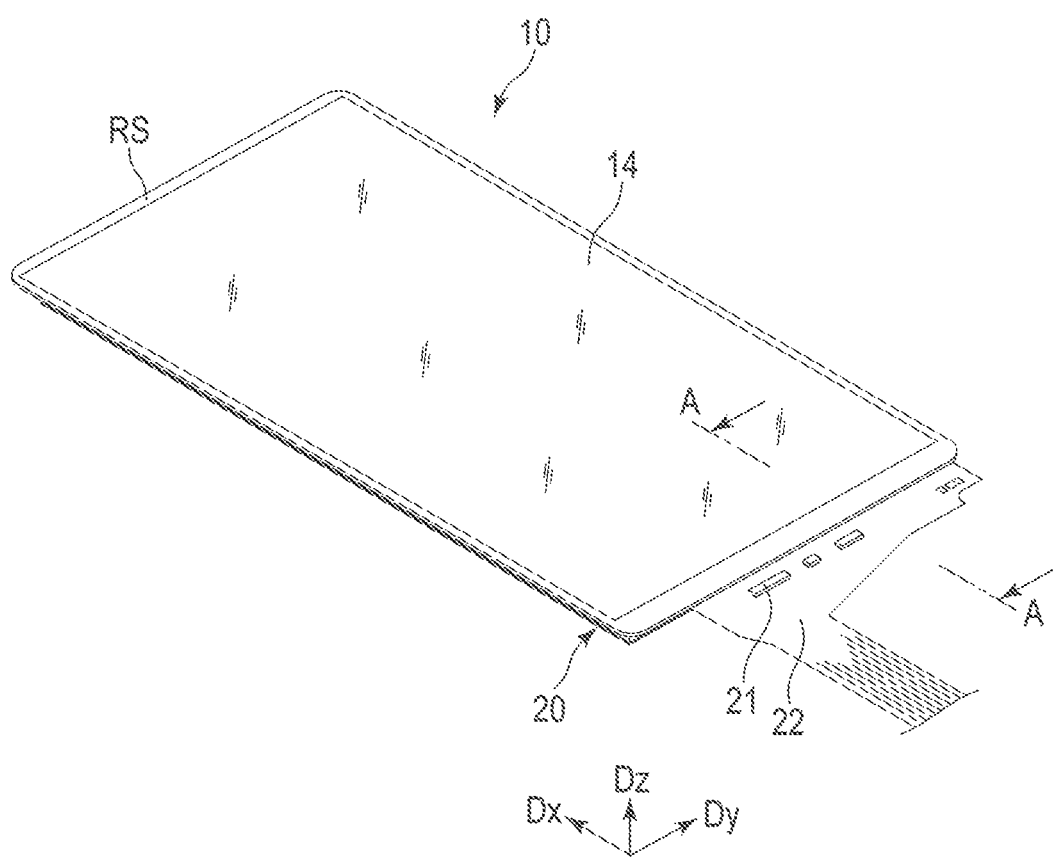
FIG. 1 is a perspective view showing a liquid crystal display device according to a first embodiment from a display surface side.

Various embodiments will be described hereinafter with reference to the accompanying drawings. In general, according to one embodiment, a backlight device comprises a case including a bottom plate; a wiring pattern formed in the case and comprising a wiring line and a connection portion; a light guide comprising an emission surface and an incident surface and arranged on the bottom plate; and a light-emitting device electrically connected to the connection portion and comprising a light-emitting surface opposing the incident surface of the light guide and a mount surface opposing the connection portion.

The disclosure is merely an example, and proper changes in keeping with the spirit of the invention, which are easily conceivable by a person with ordinary skill in the art, come within the scope of the invention as a matter of course. In addition, in some cases, in order to make the description clearer, the widths, thicknesses, shapes, etc., of the respective parts are illustrated schematically in the drawings, rather than as an accurate representation of what is implemented. However, such schematic illustration is merely exemplary, and in no way restricts the interpretation of the invention. In addition, in the specification and drawings, the same elements as those described in connection with preceding drawings are denoted by like reference numbers, and detailed description thereof is omitted unless necessary.

First Embodiment

Figure 2:
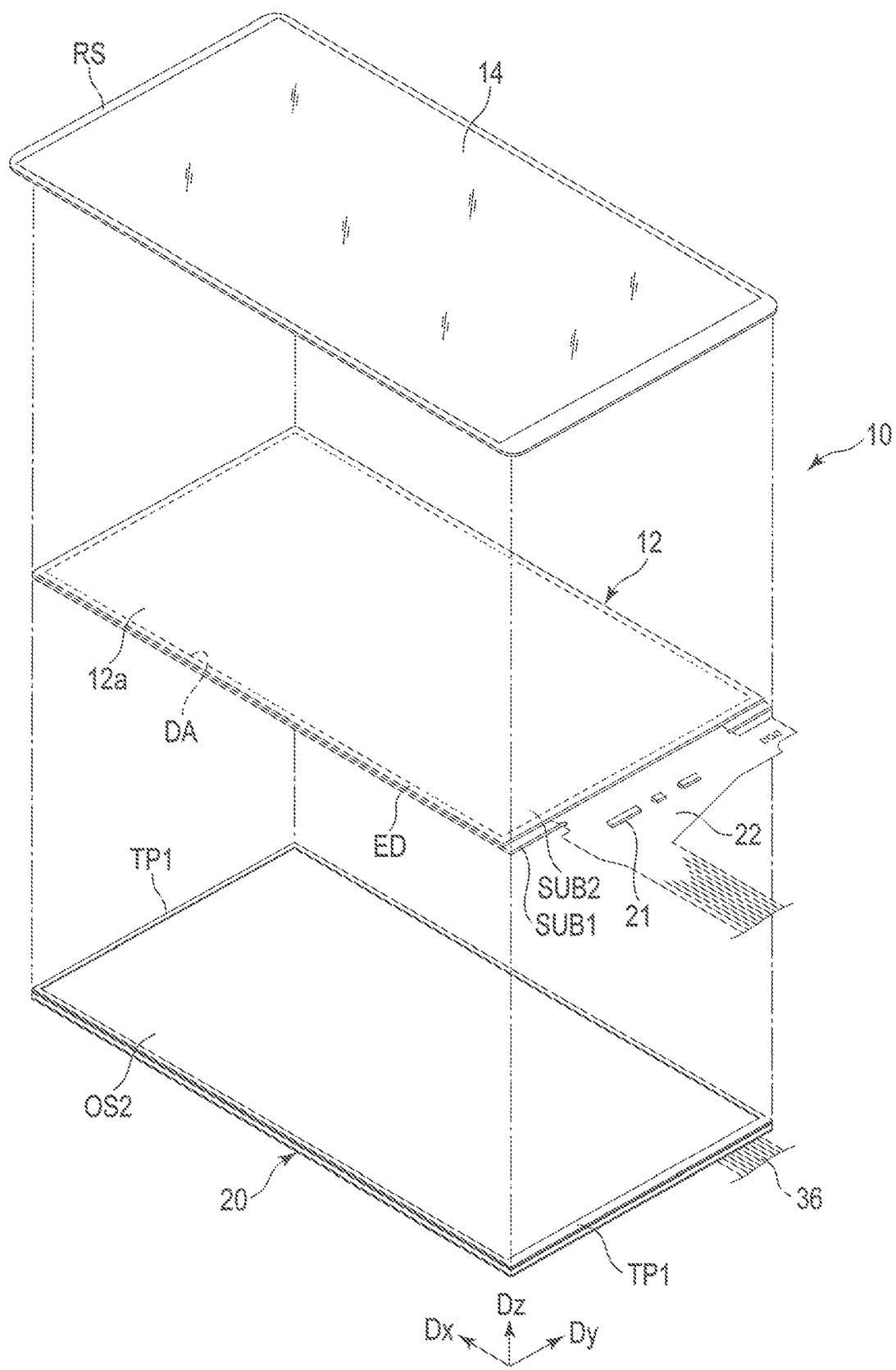
FIG. 2 is an exploded perspective view showing the liquid crystal display device.

FIG. 1 is a perspective view showing a liquid crystal display device according to the first embodiment from a display surface side. FIG. 2 is an exploded perspective view showing the liquid crystal display device.

A liquid crystal display 10 can be built in, for example, various kinds of electronic devices such as smart phones, tablet devices, cellular phones, notebook personal computers, mobile game consoles, electronic dictionaries, television devices and car-navigation systems.

As shown in FIGS. 1 and 2, the liquid crystal display 10 comprises a display panel 12 which is an active-matrix type liquid crystal display panel, a cover panel 14 overlaid on a the display surface 12a, which is one of the surfaces of the display panel 12, so as to cover the entire display surface 12a and a backlight device 20 disposed to oppose a rear surface, which is the other surface of the display panel 12. In the figures, a first direction Dx, a second direction Dy normal to this and a third direction Dz normal to the first and second directions are defined. In this embodiment, a longitudinal direction of the liquid crystal display 10 is defined as the first direction Dx, a width direction thereof as the second direction Dy and a thickness direction thereof as the third direction Dz.

Figure 4:
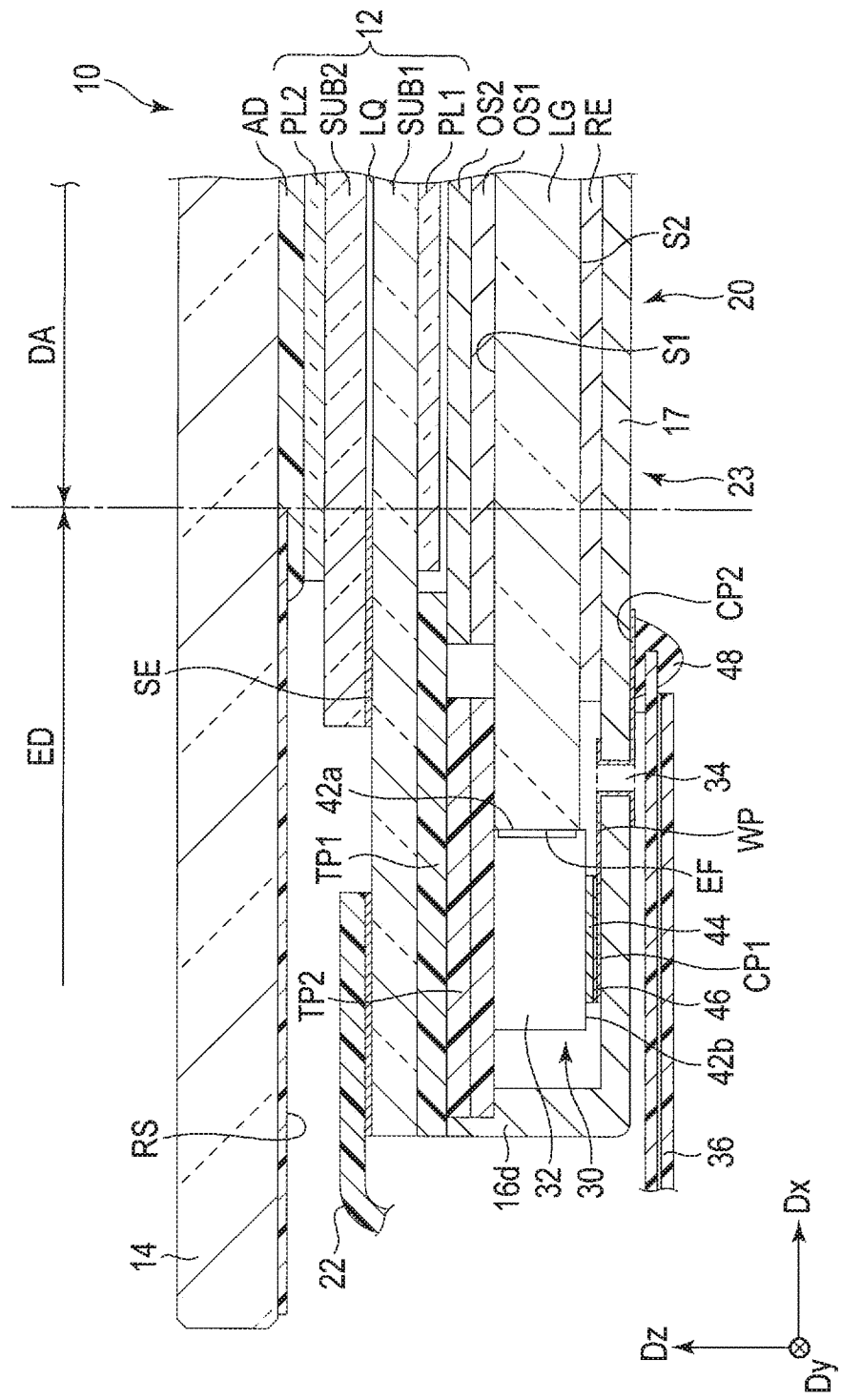
FIG. 4 is a cross-sectional view of a light source-side portion of the liquid crystal display device, taken along line A-A of FIG. 1.

FIG. 4 is a cross-sectional view showing a light source-side portion of the liquid crystal display device taken along line A-A of FIG. 1. As shown in FIGS. 2 and 4, the liquid crystal display panel 12 includes a rectangular plate-shaped first substrate SUB1, a rectangular plate-like second substrate SUB2 disposed to oppose the first substrate SUB1, and a liquid crystal layer LQ held between the first substrate SUB1 and the second substrate SUB2. Each of the first substrate SUB1 and the second substrate SUB2 is formed of a transparent insulating substrate such as a glass or resin plate. The periphery of the second substrate SUB2 is adhered to the first substrate SUB1 with a sealing material SE. A polarizer PL2 is adhered to the surface of the second substrate SUB2 to form the display surface 12a of the liquid crystal display panel 12. A polarizer PL1 is adhered to the surface of the first substrate SUB1 (the rear surface of the liquid crystal display panel 12).

In the display panel 12, a rectangular display area (active area) DA is provided in an inner side surrounded by the sealing material SE as the display surface 12a is seen in plan view. In the specification, the plan view is defined as a state of viewing the display panel from the normal direction of the surface of the display panel 12. Images are displayed in the display area DA. A rectangular frame area (non-display area) ED is provided around the display area DA. The liquid crystal panel 12 has a transmissive display function of displaying images by selectively transmitting light emitted from the backlight device 20.

In the example illustrated, a flexible printed circuit board (FPC) 22 is bonded to a short side end portion of the first substrate SUB1 and extends outward from the liquid crystal panel 12. A semiconductor element such as a driver IC chip 21 is mounted on the FPC 22 as a signal supply source which supplies a signal necessary for driving the liquid crystal panel 12.

As shown in FIGS. 2 and 4, the cover panel 14 is formed of, for example, a glass plate or transparent acrylic resin and has the shape of a rectangular plate. The cover panel 14 covers the entire display surface 12a of the liquid crystal panel 12. A frame-shaped light-shielding layer RS is formed on a peripheral portion of the rear surface of the cover panel 14(, which is the surface on the side of the display panel 12 or the surface opposite side to the surface opposing the observer). The light-shielding layer RS may be formed on an upper surface (display surface) of the cover panel 14.

The rear surface of the cover panel 14 is attached to the polarizer PL2 of the liquid crystal panel 12 with a light-transmissive adhesive or tackiness agent, for example, an adhesive sheet AD of an optical light transparent resin.

Figure 3:
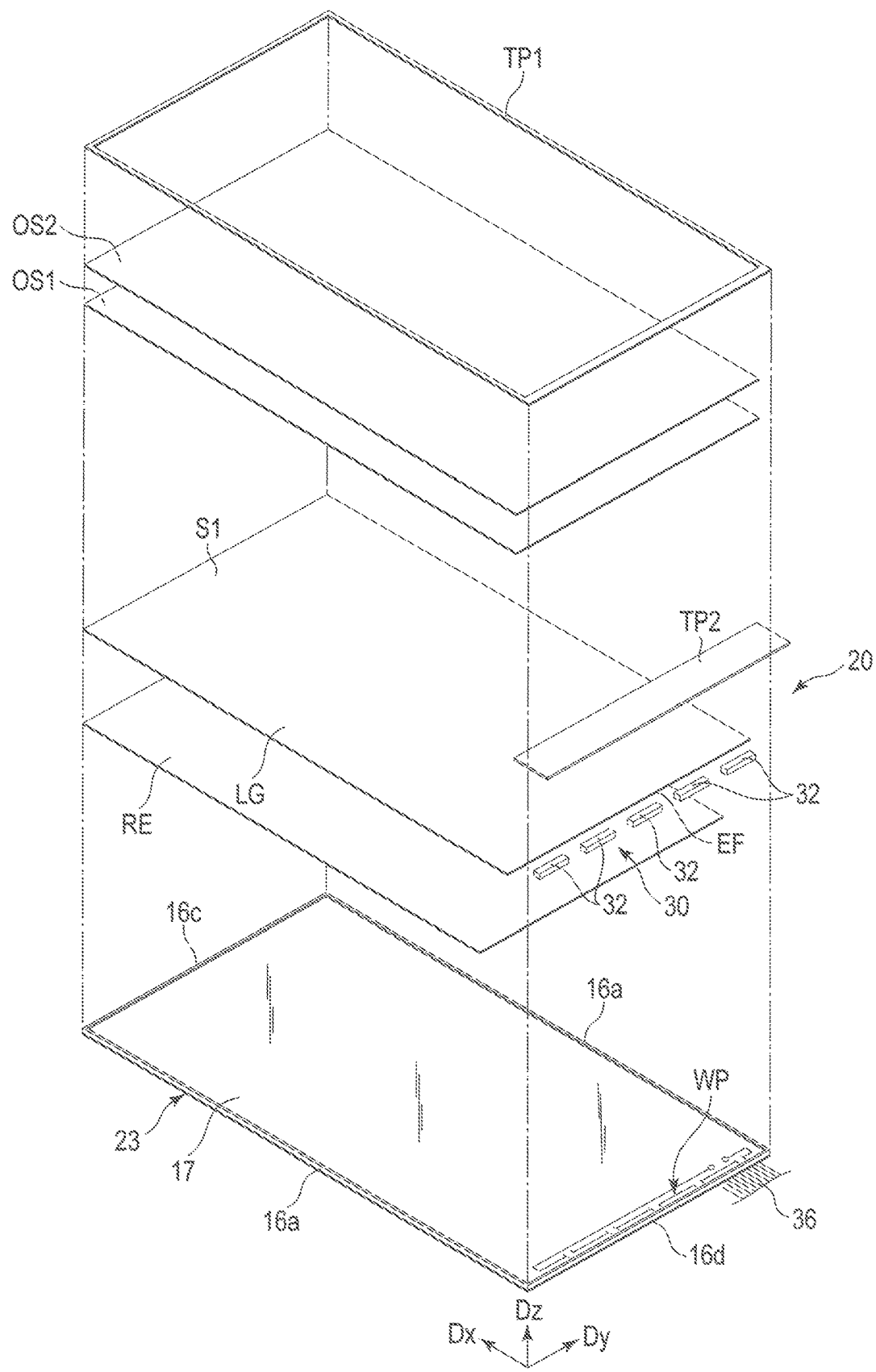
FIG. 3 is an exploded perspective view showing a backlight device of the liquid crystal display device.

FIG. 3 is an exploded perspective view showing the backlight device 20. As shown in FIGS. 2, 3, and 4, the backlight device 20 comprises a case (bezel) 23, a plurality of optical members disposed in the case 23 and a light source unit 30 which supplies light to be incident on the optical members.

The case 23 comprises a rectangular bottom plate 17, and a plurality of side plates built to stand along side edges of the bottom plate 17. The side plates includes a pair of long side plates 16a and 16b opposing each other, and a pair of short side plates 16c and 16d opposing each other. The case 23 is formed, for example, as one integrated body of a metal such as stainless steel (SUS). In place of metal, the case 23 may be formed entirely or partially by molding a resin such as polycarbonate.

The optical members of the backlight device 20 each comprise a reflective sheet RE located on the bottom plate 17 within the case 23, a light guide LG, a plurality of, for example, two optical sheets, a first optical sheet OS1 and a second optical sheet OS2, stacked on the light guide LG.

The reflective sheet RE is formed into a rectangular shape in plan view, dimensions of which are slightly smaller than those of the bottom plate 17. The reflective sheet RE is overlaid on the bottom plate 17 to cover substantially the entire surface thereof.

The light guide LG formed into a rectangular shape from, for example, a light-transmissive resin such as acrylic or silicon-based resin, so as to have a rectangular parallelepiped shape. The light guide LG comprises a first main surface S1 serving as an emission surface, a second main surface S2 on an opposite side to the first main surface S1, and a plurality of side surfaces. In this embodiment, one side surface on a short side of the light guide LG is an incidence surface EF.

The light guide LG is accommodated in the case 22 and placed on the reflective sheet RE while the second main surface S2 opposes the reflective sheet RE. The incidence surface EF of the light guide LG opposes a short side plate (first side plate) 16d on a light source side with a gap therebetween.

According to this embodiment, light-transmissive diffusion sheets or prism sheets of, for example, a synthetic resin such as polyethylene terephthalate, are used as the first optical sheet OS1 and the second optical sheet OS2. The optical sheets OS1 and OS2 are overlaid in this order on the first main surface S1 of the light guide LG At least three side edges, except for side edges of optical sheets OS1 and OS2, on the light source side, are placed on stepped portions of the long side plates 16a and 16b and the short side plate 16c. The number of optical sheets is not limited to two, but may be three or more or may be one.

Next, the light source unit 30 will be described in detail. As shown in FIGS. 3 and 4, the light source unit 30 comprises a circuit pattern WP formed on the case 23, and a plurality of light sources 32 of, for example, light-emitting devices, mounted on the circuit pattern WP and electrically and mechanically connected to the circuit pattern WP. As the light-emitting devices 32, for example, light-emitting diodes (LEDs) are employed. The wiring pattern WP is drawn out from an inner surface of the bottom plate 17 (a surface opposing the light guide LG) to an external surface of the bottom plate 17 (a surface on an opposite side to the inner surface) via a through-hole 34 formed in the bottom plate 17. The light source unit 30 further comprises a relay flexible printed circuit board (relay FPC) 36. The relay FPC 36 is connected to the wiring pattern WP on an external surface side of the bottom plate 17. The relay FPC 36 is drawn out to an outer side of the case 23 and is connected to the main FPC 22.

Figure 5:
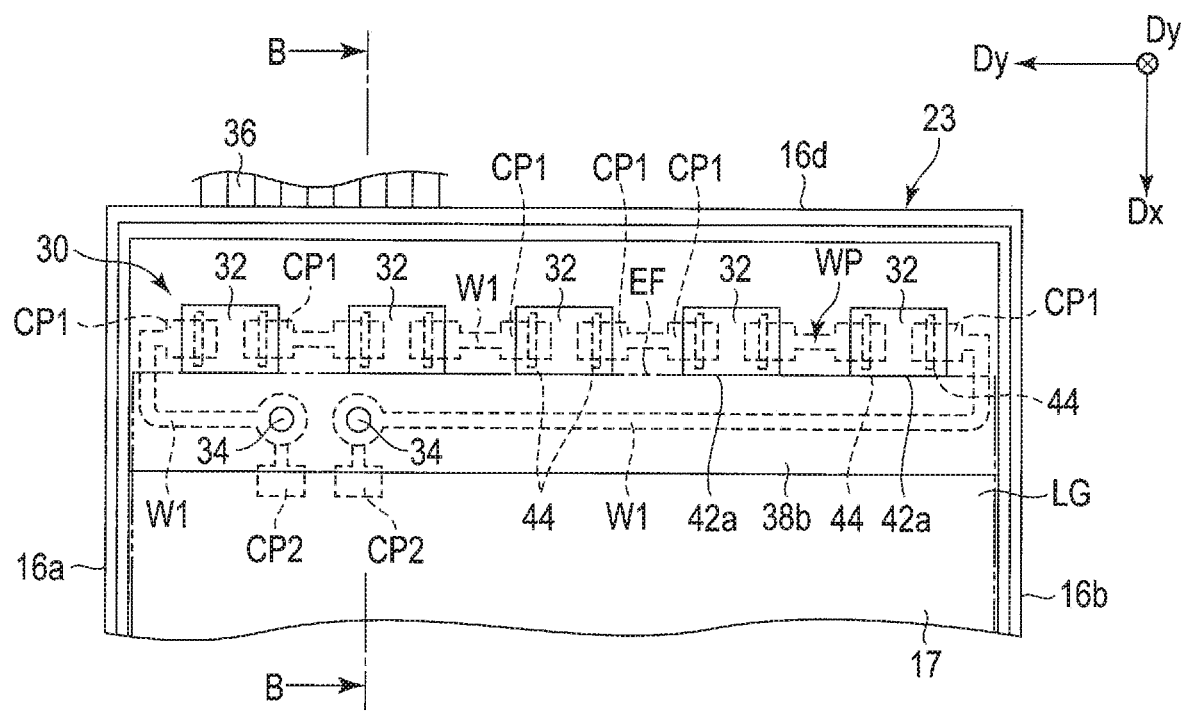
FIG. 5 is a plan view showing a light source unit of the backlight device.
Figure 6:
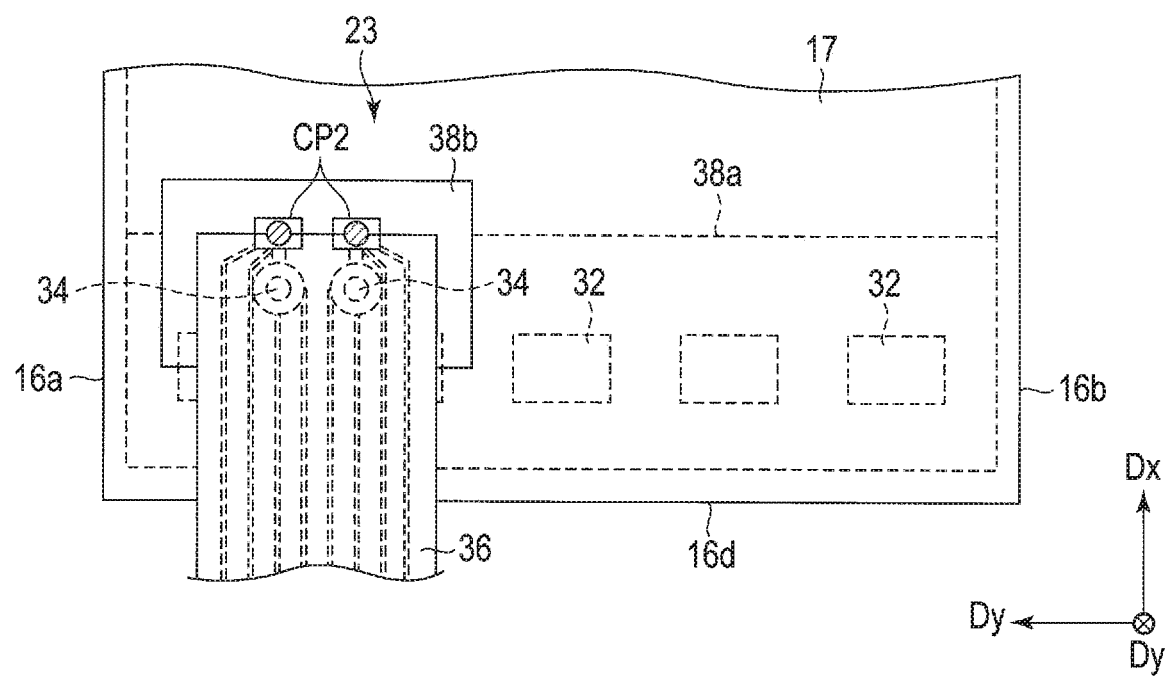
FIG. 6 is a rear view showing the backlight device from a light source side.

FIG. 5 is a plan view showing the light source unit of the backlight device. FIG. 6 is a rear view showing the backlight device from a light source side. FIG. 7 is a cross-sectional view of the backlight device taken along line B-B of FIG. 5.

As shown in FIGS. 5 and 7, a plurality of, for example, two through-holes 34 are formed in an end portion of the bottom plate 17, which is on a light source side. Each of the through-holes 34 is formed in a region which overlaps the light guide LG in the bottom plate 17, and is opened to the inner surface and the outer surface of the bottom plate 17. A first insulating layer 38*a* is formed on the inner surface of the bottom plate 17 (the surface opposing the light guide LG), the outer surface (the surface on the opposite side to the inner surface) and the through-holes 34. A conductive layer 40 is formed on the first insulating layer 38*a*, and further a second insulating layer 38*b* is formed on the conductive layer 40. The conductive layer 40 is patterned to form the wiring pattern WP. The wiring pattern WP comprises a plurality of wiring lines W1, and a plurality of contact pads (connectors) CP1 and CP2 electrically continuous with the wiring lines W1, respectively. The contact pads CP1 are provided near a short-side plate 16*d* on the inner surface of the bottom plate 17. The contact pads CP1 are arranged along the short-side plate 16*d* at predetermined intervals. Further, each of the contact pads CP1 is exposed without being covered by the second insulating layer 38*b*.

Two contact pads CP2 are provided near the through-holes 34 on the outer surface of the bottom plate 17. Each of the contact pads CP2 is exposed without being covered by the second insulating layer 38*b*.

The light source of this embodiment is of a type in which a plurality of LEDs 32, which is point light sources, are arranged at predetermined gaps. In the example illustrated, side view-type LEDs 32 are employed. The LEDs 54 each comprise, for example, a substantially rectangular parallelepiped case (package) 60 formed of a resin. One side surface of the case forms the light-emitting surface 42*a* and the bottom surface of the case which is normal to the light-emitting surface 42*a* forms a mount surface 42*b*. A pair of connection terminals 44 are provided on the mount surface 42*b*. Note that each LED 54 is formed into a substantially rectangular parallelepiped, but the shape is not limited to this. For example, the LED 54 may comprise projections and recesses in side surfaces, or may be formed into a curvy shape.

The mount surfaces 42*b* of the LEDs 32 are mounted on the wiring pattern WP of the bottom plate 17. That is, the pair of connection terminals 44 of each LED 32 are electrically and mechanically connected to a corresponding contact pad CP1 with, for example, a solder 46. The light-emitting surfaces 42*a* of the LEDs 32 are each located substantially perpendicular to the inner surface of the bottom plate 17. The LEDs 32 each emit light from the light-emitting surface 42*a* in the direction substantially parallel to the inner surface of the bottom plate 17. Note that the bonding of the LEDs 32 to the contact pad CP1 can be carried out not only by the solder 46, but also with an anisotropic conducting film (ACF) or an electro-conductive tape.

The LEDs 32 are arranged in one row along the short side plate 16*d* at predetermined intervals. The light-emitting surfaces 42*a* of the LEDs 32 are located to be substantially flush with each other and parallel to the short side plate 16*d*. The light-emitting surfaces 42*a* of the LEDs 54 adjacently oppose or abut against the incident surface EF. Thus, the LEDs 32 apply light into the light guide LG via the incident surface EF.

As shown in FIGS. 6 and 7, the relay FPC 36 is disposed to oppose the rear surface of the bottom plate 17. One end portion of each of the wiring lines of the relay FPC 36 is electrically and mechanically connected to the respective contact pad CP2 of the wiring pattern WP with a solder 48. The other end portion of the relay FPC 36 is drawn to the outside of the case 23, and connected to the main FPC 22. Thus, the LEDs 32 are mounted on the wiring pattern WP formed in the case 23, and electrically connected to the main FPC and the controller (not shown) via the wiring pattern WP and the relay FPC 36.

As shown in FIGS. 3 and 4, the backlight device 20 comprises a frame-shaped double-sided tape TP1 and a belt-shaped double-sided tape TP2. The double-sided tape TP2 is provided along with the short-side plate 16*d* of the case 23, and adhered onto side surfaces (on an opposite side to the mount surface 42*b*) of the LEDs 32. One side edge portion of the double-sided tape TP2 is adhered onto the first main surface S1 of the light guide LG, and the other side edge portion is attached onto the stepped portion of the short-side plate 16*d*. Thus, the LEDs 32 are attached onto the light guide LG and the case 23 by the double-sided tape TP2, and are held at predetermined positions, that is, the positions opposing the incident surface EF of the light guide LG Note that the double-sided tape TP2 may be colored in black with a black ink or the like, to a light-shielding function.

The double-sided tape TP1 has outer dimensions corresponding to outer dimensions of the case 23. The double-sided tape TP1 is adhered onto upper edge surfaces of the four side plates 16*a* to 16*d* while the outer edge of the tape coincides with the outer edge of the case 23. One side portion of the double-sided tape TP1 on a side of the light source extends along the short-side plate 16*d*, and is overlaid and adhered onto a light source side end of each of the double-sided tape TP1 and the second optical sheet OS2. The other three side portions of the double-sided tape TP1 extend along the long side plates 16*a* and 16*b* and the short side plate 16*c*, respectively, and are adhered onto the side plates and the peripheral portion of the second optical sheet OS2.

The backlight device 20 configured as described above is attached to the first substrate SUB1 of the display panel 12 by the double-sided tape TP1. Here, the double-sided tape TP1 is adhered onto the peripheral portion, that is, the frame area ED of the first substrate SUB1, and the outer edge coincides with the outer edge of the first substrate SUB1. The light guide LG and the first and second optical sheets OS1 and OS2 are located parallel to the display panel 12, and oppose the entire display area DA. When a drive current is applied to the LEDs 32 through the main FPC 22, the relay FPC 36 and the wiring pattern WP from the controller, the LEDs 32 are lit up and apply light from the light-emitting surface 42*a*. The light emitted from the LEDs 32 enters the light guide LG from the incident surface EF of the light guide LG, and propagates inside the light guide LG or reflects on the reflective sheet RE, to be emitted to a display panel 12 side from the first main surface (emission surface) S1.

In the backlight device 20 and the liquid crystal display device 10 of this embodiment configured as described above, a conductive layer (wiring pattern WP) is directly formed on the case 23, and the LEDs 32 are mounted on the wiring pattern WP. With this structure, the independent wiring substrate of the light source unit can be omitted. That is, the region for the wiring substrate, where the wiring lines of the conventional structure are drawn around, is no longer necessary. Therefore, the side plate (short side plate 16d) of the case 23 can be disposed closer towards the LEDs 32 by an amount equivalent to that region. Thus, the interval between the short side plate 16d on a light source side and the incident surface EF of the light guide LG, and thus the light source-side frame of the liquid crystal display 10 can be narrowed. For an example, the frame width of a conventional structure is 5.7 mm, whereas according to this embodiment, the frame width can be reduced to about 4.25 mm, thus achieving an effect of narrowing of about 1.45 mm.

The wiring pattern WP can be formed also in a region overlapping the light guide LG in the case 23, thus making it possible to draw the lines further one an outer surface side of the case 23 through the through hole 34. That is, the wiring pattern WP can be formed in the region which does not cause an influence on the frame width. Further, by connecting the relay FPC to the wiring pattern formed on the outer surface of the case 23, the relay FPC can be disposed in the position which overlaps the bottom plate 17 of the case 23 or the light guide LG With this arrangement, the relay FPC 36 can be installed without hindering the narrowing of the frame.

From the above, according to this embodiment, a backlight device with a narrower frame and a liquid crystal display device comprising the backlight device can be obtained.

In the first embodiment, the number of LEDs 32 installed is not limited to that of this embodiment, but can be varied if needed or according to the size of the LEDs. Further, as described above, the material of the case 23 is not limited to a metal, but may be a synthetic resin. In this case also, a wiring pattern can be formed directly on the case 23. Furthermore, the position of the through hole 34 in the wiring pattern WP is not limited to the position opposing the light guide LG, but may be some other position.

Next, backlight devices and liquid crystal display devices according to other embodiments will be described. In the other embodiments provided below, the same referential marks are given to the same parts as the first embodiment described above, the detailed explanations therefor is omitted or simplified. Difference parts from those of the first embodiment will be mainly described in detail.

Second Embodiment

FIG. 8 is a cross-sectional view of a light source-side portion of a backlight device according to the second embodiment.

According to the second embodiment, a top view type LED 32 is used as a light source of the light source unit 30. The case of the LED 32 comprises a light-emitting surface 42a opposing an incident surface EF of a light guide LG, and a mount surface 42b opposing the light-emitting surface 42a, and a pair of connection terminals 44 are formed on the mount surface 42b.

A wiring pattern WP of the light source unit 30 is formed on an inner surface side of a short side plate 16d of the case 23(, which is the surface opposing the light guide LG), on inner and outer surfaces of the bottom plate 17, and in a through-hole 34. The wiring pattern WP comprises a plurality of contact pads CP1 provided on the inner surface of the short side plate 16d, a plurality of contact pads CP2 provided on the outer surface of the bottom plate 17, and wiring lines electrically connected to these contact pads and extending through the through hole 34. The contact pads CP1 are exposed without being covered by a second insulating layer 38b. The mount surface 42b of the LED 32 opposes the inner surface of the short side plate 16d. A contact terminal 44 is mechanically and electrically bonded to the contact pads CP1 by a solder 46. Further, the relay FPC 36 is bonded to the contact pads CP2 by a solder 48. In the second embodiment, the other structure of the backlight device 20 is the same as that of the backlight device in the first embodiment described above.

In the backlight device 20 and the liquid crystal display according to the second embodiment configured as described above, a conductive layer (the wiring pattern WP) is formed directly on the case 23 and the LED 32 is mounted on the wiring pattern WP. With this structure, the independent wiring substrate for mounting the light source can be omitted, and therefore the frame can be even further narrowed. When the top view type LED 32 is used, a similar or even higher effect of narrowing the frame can be achieved as compared to the case of using a side view type LED 32.

Third Embodiment

Figure 9:
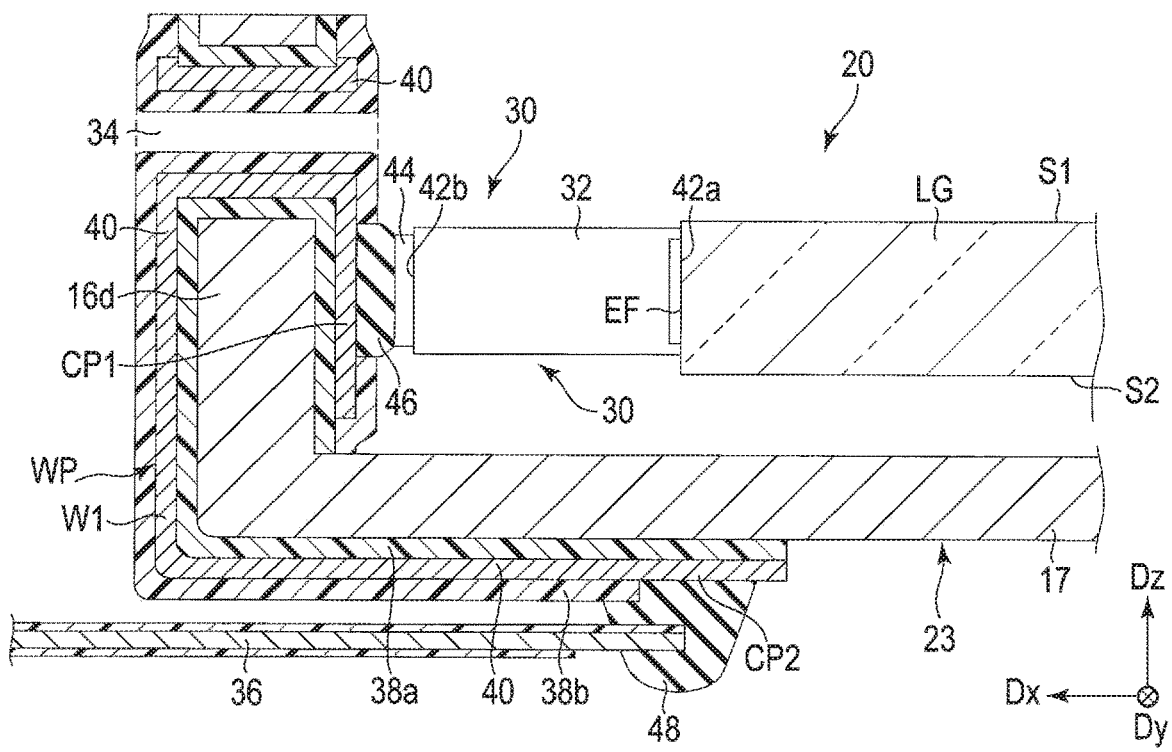
FIG. 9 is a cross-section view of a light source-side portion of a backlight device according to a third embodiment.

FIG. 9 is a cross-section view of a light source-side portion of a backlight device according to the third embodiment.

According to the third embodiment, a top view type LED 32 is used as a light source of the light source unit 30. The case of the LED 32 comprises a light-emitting surface 42a opposing an incident surface EF of a light guide LG, and a mount surface 42b opposing the light-emitting surface 42a, and a pair of connection terminals 44 are formed on the mount surface 42b.

A wiring pattern WP of the light source unit 30 is formed to extend on an inner surface and an outer surface (on an opposite side to the inner surface) of a short side plate 16d of the case 23, on an outer surface of the bottom plate 17, and along a through-hole 34. In this embodiment, the through-hole 34 is formed in the short side plate 16d, so as to penetrate therethrough while normally intersecting the short side plate 16d. The wiring pattern WP comprises a plurality of contact pads CP1 provided on the inner surface of the short side plate 16d, a plurality of contact pads CP2 provided on the outer surface of the bottom plate 17, and wiring lines electrically connected to these contact pads and extending through the through hole 34. The contact pads CP1 and CP2 are exposed without being covered by a second insulating layer 38b. The mount surface 42b of the LED 32 opposes the inner surface of the short side plate 16d. A contact terminal 44 is mechanically and electrically bonded to the contact pads CP1 by a solder 46. Further, the relay FPC 36 is bonded to the contact pads CP2 by a solder 48. In the third embodiment, the other structure of the backlight device 20 is the same as that of the backlight device in the first embodiment described above.

The third embodiment configured as described above can also achieve an advantageous effect similar to that of the second embodiment provided before.

Fourth Embodiment

Figure 10:
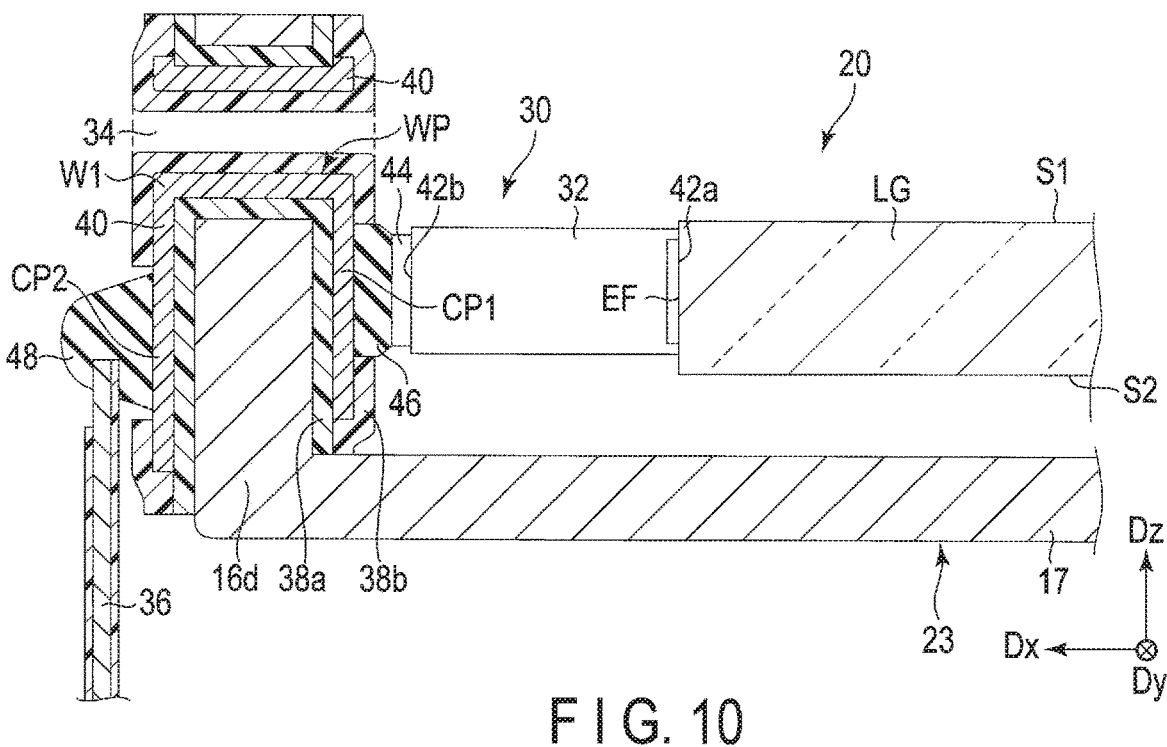
FIG. 10 is a cross-sectional view of a light source-side portion of a backlight device according to a fourth embodiment.

FIG. 10 is a cross-section view of a light source-side portion of a backlight device according to the fourth embodiment.

According to the fourth embodiment, a top view type LED 32 is used as a light source of the light source unit 30. A wiring pattern WP of the light source unit 30 extends along inner and outer surfaces of a short side plate 16d of the case 23 and a through-hole 34. The through-hole 34 is formed in the short side plate 16d, so as to penetrate therethrough while normally intersecting the short side plate 16d. The wiring pattern WP formed from a conducting layer comprises a plurality of contact pads CP1 provided on the inner surface of the short side plate 16d, a plurality of contact pads CP2 provided on the outer surface of the bottom plate 17, and wiring lines electrically connected to these contact pads and extending through the through hole 34. The contact pads CP1 and CP2 are exposed without being covered by a second insulating layer 38b.

The mount surface 42b of the LED 32 opposes the inner surface of the short side plate 16d. A contact terminal 44 is mechanically and electrically bonded to the contact pads CP1 by a solder 46. Further, the relay FPC 36 is bonded to the contact pads CP2 by a solder 48. With this structure, a connection end of the relay FPC 36 is disposed to overlap the short side plate 16d. In the fourth embodiment, the other structure of the backlight device 20 is the same as that of the backlight device in the first embodiment described above.

The fourth embodiment configured as described above can also achieve an advantageous effect similar to that of the second embodiment provided before.

Fifth Embodiment

FIG. 11 is a cross-section view of a light source-side portion of a backlight device according to the fifth embodiment. According to this embodiment, a case 23 of a backlight device 20 comprises a bottom plate 17 formed from a reflective sheets RE and a rectangular resin frame 70 fixed to a circumferential edge of the reflective sheet RE. The reflective sheet RE is formed to have outer dimensions greater than those of the light guide LG, and in the light source side, it extends over the incident surface EF to an outer side of the light guide LG The resin frame 70 comprises a pair of long side plates 16a and 16b each extending along a respective side edge of the reflective sheet, and a pair of short side plates 16c and 16d (here, only the short side plate 16d on the light source side is illustrated). The resin frame 70 is fixed to the reflective sheet RE with, for example, a frame-shaped double-sided tape 72.

A wiring pattern WP of the light source unit 30 formed from a conductive layer is provided on an inner surface (opposing the light guide LG) and an outer surface of the reflective sheet RE and in a through hole 34. The through hole 34 is formed to penetrate the reflective sheet RE. The wiring pattern WP comprises a plurality of contact pads CP1 provided on an inner surface of the reflective sheet RE, a plurality of contact pads CP2 provided on an outer surface of the reflective sheet RE, and wiring lines electrically connected to these contact pads and extending through the through hole 34. The contact pads CP1 are exposed without being covered by the second insulating layer 38b.

A side view type LED 32 is used as a light source. The LED 32 comprises a light-emitting surface 42a adjacently opposing an incident surface EF of the light guide LG, a mount surface 42b normal to the light-emitting surface 42a and opposing the reflective sheet RE and a contact terminal 44 provided on the mount surface 42b. The mount surface 42b is mounted on the wiring pattern WP. That is, the contact terminal 44 is mechanically and electrically bonded to the contact pads CP1 with a solder 46. Further, a relay FPC 36 is bonded to the contact pads CP2 with a solder 48. In the fifth embodiment, the other structure of the backlight device 20 and the other structure of the liquid crystal display device are the same as those of the first embodiment described above.

According to the fifth embodiment configured as described above, the bottom plate of the case 23 is formed from a reflective sheet, and thus another separate bottom plate is unnecessary. With this structure, it is possible to even further slim down the backlight device 20. Further, the fifth embodiment can also achieve an advantageous effect similar to that of the first embodiment.

Note that in the embodiment, the type of the LED is not limited to the side view type, but may be a top view type. Moreover, the wiring pattern can be formed on the resin frame 70.

Modified Example 1

In the first to fifth embodiments provided above, the relay FPC 36 may be bonded to the contact pads CP2 not only by the solder 48, but also an anisotropic conducting film (ACF) 74 or an electric conductive tape may as well be used as shown in FIG. 12.

Modified Example 2

Figure 13:
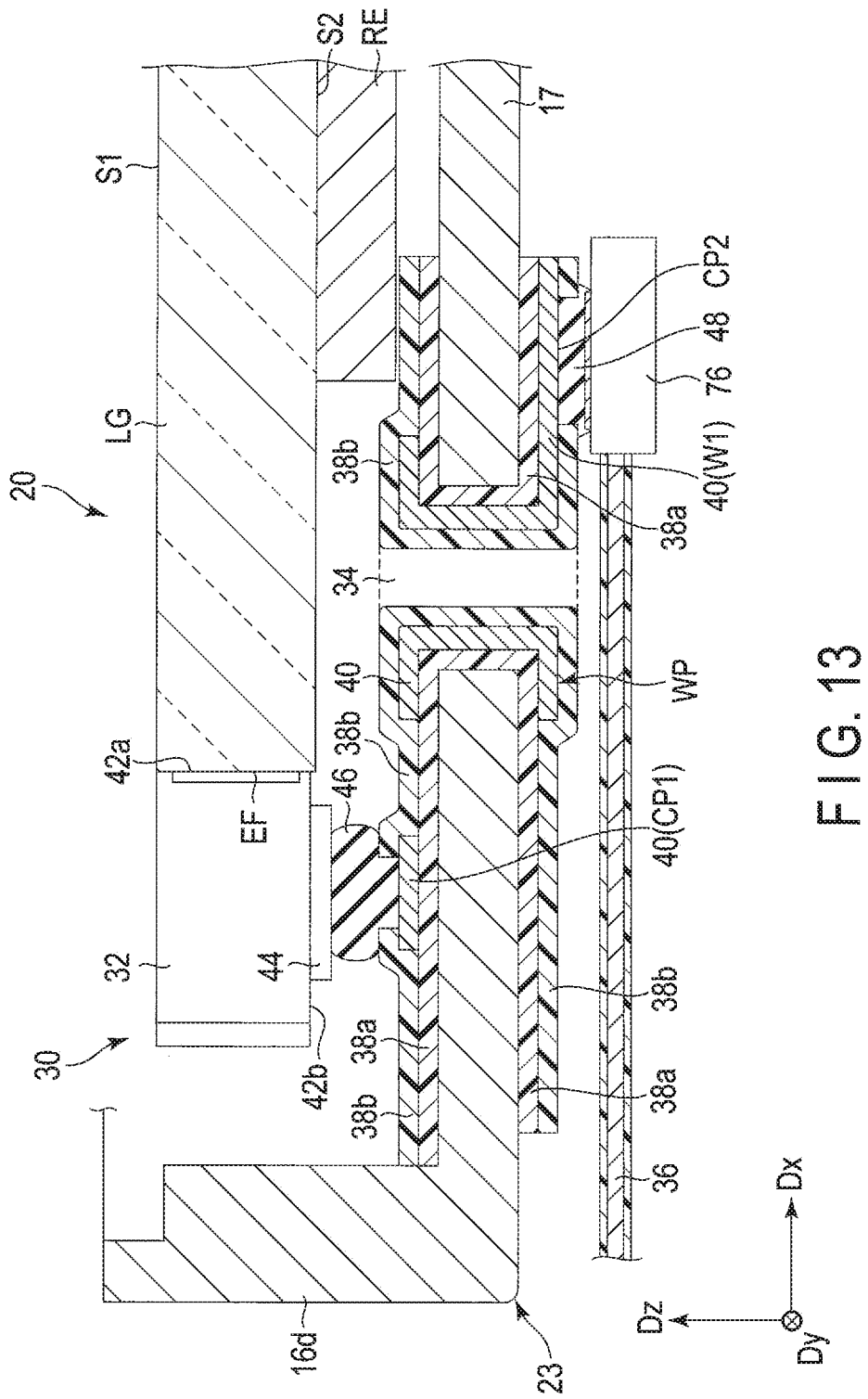
FIG. 13 is a cross-sectional view of a light source-side portion of a liquid crystal display device according to a second modified example.

As shown in FIG. 13, the relay FPC 36 may be bonded to the contact pads CP2 through the connector 76 provided in the connection end.

Modified Example 3

Figure 14:
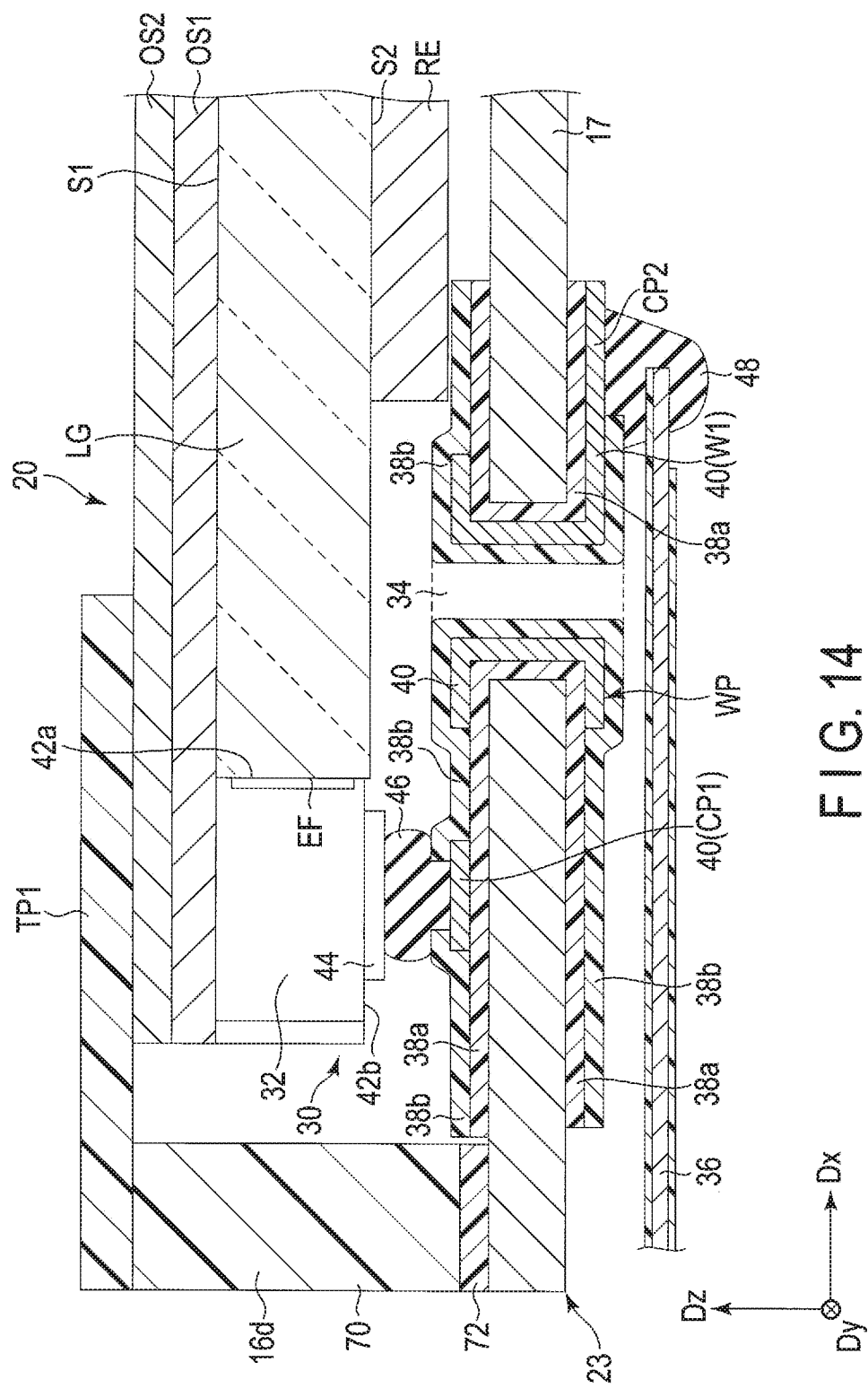
FIG. 14 is a cross-sectional view of a light source-side portion of a liquid crystal display device according to a third modified example.

In the first to fourth embodiments provided above, the case 23 may be formed from not only a metal, but entirely or partially from a synthetic resin. As shown in FIG. 14, the case 23 may be configured to comprise a bottom plate 17 formed of a metal such as stainless steel (SUS), and a frame-shaped resin frame 70 fixed to a circumferential edge of the bottom plate 17 by a double-sided tape 72. The resin frame 70 constitutes the four side plates of the case 23.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

Based on the structures which have been described in the above-provided embodiments and modifications, a person having ordinary skill in the art may achieve structures with arbitral design changes; however, as long as they fall within the scope and spirit of the present invention, such structures are encompassed by the scope of the present invention. For example, the structural members of the liquid crystal panel and the backlight device and the outer and inner shapes of the frame are not limited to rectangular, but one or both of the outer and inner shapes may be in some other shape, for example, polygonal, circular, elliptical, a combination of any of these or the like when seen in plan view. The liquid crystal display devices and illumination units are not limited to a flat shape but may be partially or entirely curved or inclined. The materials of the structural members are not limited to those of the examples provided above, but may be selected from various options. Furthermore, regarding the present embodiments, any other advantages and effects which would be obvious from the description of the specification or arbitrarily conceived by a skilled person are naturally considered achievable by the present invention.

Embodiments recited in the claims of the present application will be appended below.

(1) A backlight device comprising:
a case including a bottom plate;
a wiring pattern formed in the case and comprising a wiring line and a connection portion;
a light guide comprising an emission surface and an incident surface and arranged on the bottom plate; and
a light-emitting device electrically connected to the connection portion and comprising a light-emitting surface opposing the incident surface of the light guide and a mount surface opposing the connection portion.

(2) The backlight device according to item (1), wherein the case comprises a through hole, and the wiring pattern comprises a plurality of wiring lines extending from on an inner surface of the case via the through hole onto an outer surface of the case, a plurality of first connection portions provided on the inner surface of the case and electrically connected to the wiring line, and a second connection portion provided on the outer surface of the case.

(3) The backlight device according to item (2), further comprising a wiring substrate provided on an outer surface side of the case and connected to the second connection portion.

(4) The backlight device according to item (2), wherein the first connection portions are provided on the inner surface of the bottom plate, and the second connection portion is provided on the outer surface of the bottom plate.

(5) The backlight device according to item (4), wherein the through hole is formed in the bottom plate and opened to the inner surface and the outer surface of the bottom plate in a region which overlaps the light guide.

(6) The backlight device according to item (2), wherein the case comprises a first side plate provided along a side edge of the bottom plate and opposes the incident surface of the light guide with a gap therebetween, and
the first connection portions are provided on an inner surface of the first side plate, the second connection portion is provided on the outer surface of the bottom plate, and the through hole is formed in the bottom plate.

(7) The backlight device according to item (2), wherein the case comprises a first side plate provided along a side edge of the bottom plate and opposes the incident surface of the light guide with a gap therebetween, and
the first connection portions are provided on an inner surface of the first side plate, the second connection portion is provided on the outer surface of the bottom plate, the through hole is formed in the first side plate, and the wiring line extends from the first connection portion to the second connection portion via the through hole along the outer surface of the first side plate and the outer surface of the bottom plate.

(8) The backlight device according to item (2), wherein the case comprises a first side plate provided along the side edge of the bottom plate and opposing the incident surface of the light guide with a gap therebetween,
the first connection portions are provided on the inner surface of the first side plate, the second connection portion is provided on the outer surface of the first side plate, the through hole is formed in the first side plate, and the wiring line extends from the first connection portion to the second connection portion via the through hole along the outer surface of the first side plate.

(9) The backlight device according to any one of items (1) to (8), wherein the case is formed of a metal.

(10) The backlight device according to any one of items (1) to (8), wherein the case is formed of a resin.

(11) The backlight device according to any one of items (1) to (8), wherein the case comprises a reflective sheet which constitutes the bottom plate and a resin frame fixed to a circumferential edge of the reflective sheet and constituting a side plate.

(12) A liquid crystal display device comprising:
a liquid crystal panel; and
a backlight device opposing the liquid crystal panel,
the backlight device comprising:
a case including a bottom plate;
a wiring pattern formed in the case and comprising a wiring line and a connection portion;
a light guide comprising an emission surface and an incident surface and disposed on the bottom plate; and
a light-emitting device electrically connected to the connection portion and comprising a light-emitting surface opposing the incident surface of the light guide and a mount surface opposing the connection portion.

(13) The display device according to item (12), wherein the case comprises a through hole, and the wiring pattern comprises a plurality of wiring lines extending from on an inner surface of the case via the through hole onto an outer surface of the case, a plurality of first connection portions provided on the inner surface of the case and electrically connected to the wiring line, and a second connection portion provided on the outer surface of the case.

(14) The display device according to item (13), further comprising a wiring substrate provided on an outer surface side of the case and connected to the second connection portion.

(15) The display device according to item (13), wherein the first connection portions are provided on the inner surface of the bottom plate, and the second connection portion is provided on the outer surface of the bottom plate.

(16) The display device according to item (15), wherein the through hole is formed in the bottom plate and opened to the inner surface and the outer surface of the bottom plate in a region which overlaps the light guide.

(17) The display device according to item (13), wherein the case comprises a first side plate provided along a side edge of the bottom plate and opposes the incident surface of the light guide with a gap therebetween, and
the first connection portions are provided on an inner surface of the first side plate, the second connection portion is provided on the outer surface of the bottom plate, and the through hole is formed in the bottom plate.

(18) The display device according to item (13), wherein the case comprises a first side plate provided along a side edge of the bottom plate and opposes the incident surface of the light guide with a gap therebetween, and
the first connection portions are provided on an inner surface of the first side plate, the second connection portion is provided on the outer surface of the bottom plate, the through hole is formed in the first side plate, and the wiring line extends from the first connection portion to the second connection portion via the through hole along the outer surface of the first side plate and the outer surface of the bottom plate.

(19) The display device according to item (13), wherein the case comprises a first side plate provided along the side edge of the bottom plate and opposes the incident surface of the light guide with a gap therebetween, the first connection portions are provided on the inner surface of the first side plate, the second connection portion is provided on the outer surface of the first side plate, the through hole is formed in the first side plate, and the wiring line extends from the first connection portion to the second connection portion via the through hole along the outer surface of the first side plate.

(20) The display device according to any one of items (12) to (19), wherein the case is formed of a metal.

(21) The display device according to any one of items (12) to (19), wherein the case is formed of a resin.

(22) The display device according to any one of items (12) to (19), wherein the case comprises a reflective sheet which constitutes the bottom plate and a resin frame fixed to a circumferential edge of the reflective sheet and constituting a side plate.

What is claimed is:

1. A backlight device comprising:
a case comprising a horizontal bottom plate and a through hole;
a wiring pattern formed in the case and comprising a plurality of wiring lines extending from on an inner surface of the case via the through hole onto an outer surface of the case, a plurality of first connection portions provided on the inner surface of the case and electrically connected to a wiring line of the plurality of wiring lines, and a second connection portion provided on the outer surface of the case;
a light guide comprising a horizontal light emission surface and a vertical light incident surface and arranged on the bottom plate; and
a light-emitting device electrically connected to a first connection portion of the plurality of the first connection portions and comprising a light-emitting surface opposing the light incident surface of the light guide and a mount surface opposing the first connection portion,
wherein
the case comprises a first side plate provided along a side edge of the bottom plate and opposes the light incident surface of the light guide with a gap therebetween, and
the first connection portions are provided on an inner surface of the first side plate, the second connection portion is provided on an outer surface of the bottom plate, the through hole is formed in a vertical portion of the first side plate, and the wiring line extends from the first connection portion via the through hole and extends to the second connection portion along an outer surface of the first side plate and the outer surface of the bottom plate.

2. The backlight device according to claim 1, further comprising a wiring substrate provided on an outer surface side of the case and connected to the second connection portion.

3. The backlight device according to claim 1, wherein the case is formed of a metal.

4. The backlight device according to claim 1, wherein the case is formed of a resin.

5. The backlight device according to claim 1, wherein the case comprises a reflective sheet which constitutes the bottom plate and a resin frame fixed to a circumferential edge of the reflective sheet and constituting a side plate.

6. A backlight device comprising:
a case comprising a horizontal bottom plate and a through hole;
a wiring pattern formed in the case and comprising a plurality of wiring lines extending from on an inner surface of the case via the through hole onto an outer surface of the case, a plurality of first connection portions provided on the inner surface of the case and electrically connected to a wiring line of the plurality of wiring lines, and a second connection portion provided on the outer surface of the case;
a light guide comprising a horizontal light emission surface and a vertical light incident surface and arranged on the bottom plate; and
a light-emitting device electrically connected to a first connection portion of the plurality of the first connection portions and comprising a light-emitting surface opposing the light incident surface of the light guide and a mount surface opposing the first connection portion,
wherein
the case comprises a first side plate bent upward from a side edge of the bottom plate and opposing the light incident surface of the light guide with a gap therebetween,
the first connection portions are provided on an inner surface of the first side plate, the second connection portion is provided on an outer surface of the first side plate, the through hole is formed in a vertical portion of the first side plate, and the wiring line extends from the first connection portion to the second connection portion via the through hole along the outer surface of the first side plate.

7. A liquid crystal display device comprising:
a liquid crystal panel; and
a backlight device opposing the liquid crystal panel,
the backlight device comprising:
a case comprising a horizontal bottom plate and a through hole;
a wiring pattern formed in the case and comprising a plurality of wiring lines extending from on an inner surface of the case via the through hole onto an outer surface of the case, a plurality of first connection portions provided on the inner surface of the case and electrically connected to a wiring line of the plurality of wiring lines, and a second connection portion provided on the outer surface of the case;
a light guide comprising a horizontal light emission surface and a vertical light incident surface and disposed on the bottom plate; and
a light-emitting device electrically connected to a first connection portion of the plurality of the first connection portions and comprising a light-emitting surface opposing the light incident surface of the light guide and a mount surface opposing the first connection portion,
wherein
the case comprises a first side plate provided along a side edge of the bottom plate and opposes the light incident surface of the light guide with a gap therebetween, and
the first connection portions are provided on an inner surface of the first side plate, the second connection portion is provided on an outer surface of the bottom plate, the through hole is formed in a vertical portion of the first side plate, and the wiring line extends from the first connection portion via the through hole and extends to the second connection portion along an outer surface of the first side plate and the outer surface of the bottom plate.

8. The display device according to claim 7, further comprising a wiring substrate provided on an outer surface side of the case and connected to the second connection portion.

9. The display device according to claim 7, wherein the case comprises a reflective sheet which constitutes the bottom plate and a resin frame fixed to a circumferential edge of the reflective sheet and constituting a side plate.

10. A liquid crystal display device comprising:

a liquid crystal panel; and a backlight device opposing the liquid crystal panel, the backlight device comprising:

a case with comprising a horizontal bottom plate and a through hole;

a wiring pattern formed in the case and comprising a plurality of wiring lines extending from on an inner surface of the case via the through hole onto an outer surface of the case, a plurality of first connection portions provided on the inner surface of the case and electrically connected to a wiring line of the plurality of wiring lines, and a second connection portion provided on the outer surface of the case;

a light guide comprising a horizontal light emission surface and a vertical light incident surface and disposed on the bottom plate; and a light-emitting device electrically connected to a first connection portion of the plurality of the first connection portions and comprising a light-emitting surface opposing the light incident surface of the light guide and a mount surface opposing the first connection portion, wherein the case comprises a first side plate bent upward from a side edge of the bottom plate and opposes the light incident surface of the light guide with a gap therebetween, and the first connection portions are provided on an inner surface of the first side plate, the second connection portion is provided on an outer surface of the first side plate, the through hole is formed in a vertical portion of the first side plate, and the wiring line extends from the first connection portion to the second connection portion via the through hole along the outer surface of the first side plate.

* * * * *